United States Patent [19]

Rastetter et al.

[11] Patent Number: 4,469,201

[45] Date of Patent: Sep. 4, 1984

[54] CLAMPING DEVICE

[75] Inventors: Adolf Rastetter; Erich Schmalenbach, both of Karlsruhe, Fed. Rep. of Germany

[73] Assignee: Sitema, Gesellschaft für Sicherheitstechnik und Maschinenbau mbH, Karlsruhe, Fed. Rep. of Germany

[21] Appl. No.: 439,716

[22] Filed: Nov. 4, 1982

[30] Foreign Application Priority Data

Nov. 7, 1981 [DE] Fed. Rep. of Germany ....... 3144359

[51] Int. Cl.³ ............................................ B65H 59/10
[52] U.S. Cl. ..................................... 188/67; 175/422
[58] Field of Search ................. 24/523, 524, 527, 529; 175/422; 188/67

[56] References Cited

U.S. PATENT DOCUMENTS

| 1,820,479 | 8/1931 | O'Brien | 175/422 |
| 2,491,711 | 12/1949 | Calhoun | 24/263 DA |
| 2,589,159 | 3/1952 | Stone | 175/422 |
| 2,689,139 | 9/1954 | Jones et al. | 175/422 |
| 3,052,943 | 9/1962 | Jones | 188/67 |
| 3,472,535 | 10/1969 | Kinley | 188/67 |
| 3,748,702 | 7/1973 | Brown | 24/263 DA |

FOREIGN PATENT DOCUMENTS 2333491 1/1975 Fed. Rep. of Germany ........ 24/263 DA

Primary Examiner—Victor N. Sakran
Attorney, Agent, or Firm—Wenderoth, Lind & Ponack

[57] ABSTRACT

A clamping device for the play-free fixing of a bar has clamping jaws radially slidably mounted in the housing of the device, into an outer release position and an inner clamping position. A double-acting servo-piston is disposed about the bar and has connected to it wedge elements which extend axially between the housing and the respective jaws and which have inclined faces engaging correspondingly inclined faces of the jaws, so that axial movement of the servo-piston causes the jaws to move inward towards or outward from the clamping position. A releasable locking device may additionally be provided for locking one or more of the wedge elements and the piston to the wall of the housing when the piston is in its position corresponding to the clamping position of the jaws.

8 Claims, 3 Drawing Figures

CLAMPING DEVICE

BACKGROUND OF THE INVENTION

The invention relates to clamping devices for fixing a bar so as to be substantially without play.

Clamping devices are known which comprise separate clamping jaws arranged in the housing of a clamping device, the jaws being displaceable between a release position and a locked position along guide faces inclined towards the central axis of the bar by means of a servo-piston which moves parallel to the bar. Such a device is described in German Patent Application No. P 31 18 449.9. In this arrangement, an annular piston associated with the servo-drive displaces the clamping jaws radially onto associated inclined guide faces in the housing to firmly clamp the load-carrying bar in a self-locking manner. The locking action is cancelled by a movement of the servo-piston in the release direction.

For many purposes, a clamping device of this kind enables a satisfactory non-variable clamping action to be provided in the setting position reached, and this action can be cancelled without movement of the load in the direction for release. However, for some applications, for example in the precise adjustment and setting of heavy machine parts, including the setting of the rollers in trains of rollers and also in the precise adjustment of the level of structural components, a clamping device is required that gives a yielding engagement and prevents any appreciable changes in the setting position.

SUMMARY OF THE INVENTION

According to this invention, there is provided a clamping device comprising a housing, a bar mounted for guided movement in the housing, a plurality of jaws disposed about the bar and mounted in the housing for only radial movement inward into gripping engagement with the bar and outward out of such gripping engagement, a cylinder formed in the housing and having its axis extending in a direction lengthwise of the bar, a piston slidably mounted in the cylinder, passage means whereby pressure fluid can be applied in the cylinder at at least one side of the piston, and wedge elements disposed radially between the jaws and the housing and connected to the piston for movement therewith in each direction, such wedge elements being adapted in cooperation with the housing and the jaws along planar guide faces to cause the jaws to grip and release the rod.

The wedge elements preferably form inclined planar guide faces between the housing and the clamping jaws. Since the clamping jaws execute only a radial movement but no appreciable longitudinal movement, each of the setting positions into which the device is moved by the piston, which may be a servo piston, is precisely fixed.

The clamping jaws, advantageously arranged radially symmetrically around the piston rod, may conveniently be held by portions of a cover of the housing which engage in a complementary annular groove formed in the clamping jaws jointly and which ensure adequate radial mobility accompanied by diminishing displaceability in the longitudinal direction.

The coefficient of friction and the angle of slope of bevelled portions of the clamping jaws and on matching guide faces of the wedge elements are expediently so selected that self-locking occurs on displacement of the clamping jaws into the locking position. In some applications, e.g. those affected by vibration, it may be preferable not to hold the jaws in the locking position merely by a self-locking action, but to provide locking means which secures the clamping jaws in the locking position.

The locking means may conveniently engage the wedge elements, but in some instances it may also engage the piston or the clamping jaws.

In a preferred form of construction, the locking means can be disengaged by movement of the piston into the release position. For this purpose, the locking means may comprise spring-loaded locking members arranged in the housing, and these members may engage in complementary recesses in the wedge elements and the housing when the locking position is reached. In this arrangement, the wedge elements are connected to the piston by a lost-motion connection such that the initial movement of the piston moves the locking means into an inoperative position.

A preferred construction which has been tried on a practical basis comprises two locking members, and an engagement recess in the piston in the form of an annular groove bevelled at one side. The location and degree of the bevel, in conjunction with the axial extent of the lost motion in the connection to the piston, are so selected that the radially inner of the two locking members, which are arranged one behind the other, retreats into a through-bore or recess in the wedge element to such extent that the outer locking member is moved out of the locking position and into the position for releasing the wedge element during the taking-up of the lost motion by the piston in its movement towards the release position.

The locking members preferably take the form of two balls disposed one behind the other, though they may also be roll-shaped members or the like.

The piston is advantageously an annular piston, which is engaged in a complementary cylinder in the housing and on the bar, suitable sealing radial elements being interposed.

The bar may be part of any one of a large variety of adjusting means, for example means for adjusting the gaps between rollers in rolling mills, for setting the level of lifting platforms, for levelling supported vehicles, or for feed mechanisms associated with machine tools. The drive for displacing the bar which may be heavily loaded, is often achieved by means of a double-acting servo-piston, which is arranged in a cylinder mounted on the housing.

Bearing elements generating little friction, such as ball, needle or roller bearings, may be advantageously provided on the guide faces between the wedge elements and the clamping jaws. Furthermore, the clamping jaws and/or the wedge elements may have additional surface coatings which improve the gripping properties.

BRIEF DESCRIPTION OF THE DRAWINGS

One embodiment of the invention is illustrated diagrammatically in the drawings, in which.

DETAILED DESCRIPTION OF THE INVENTION

Figure 1:
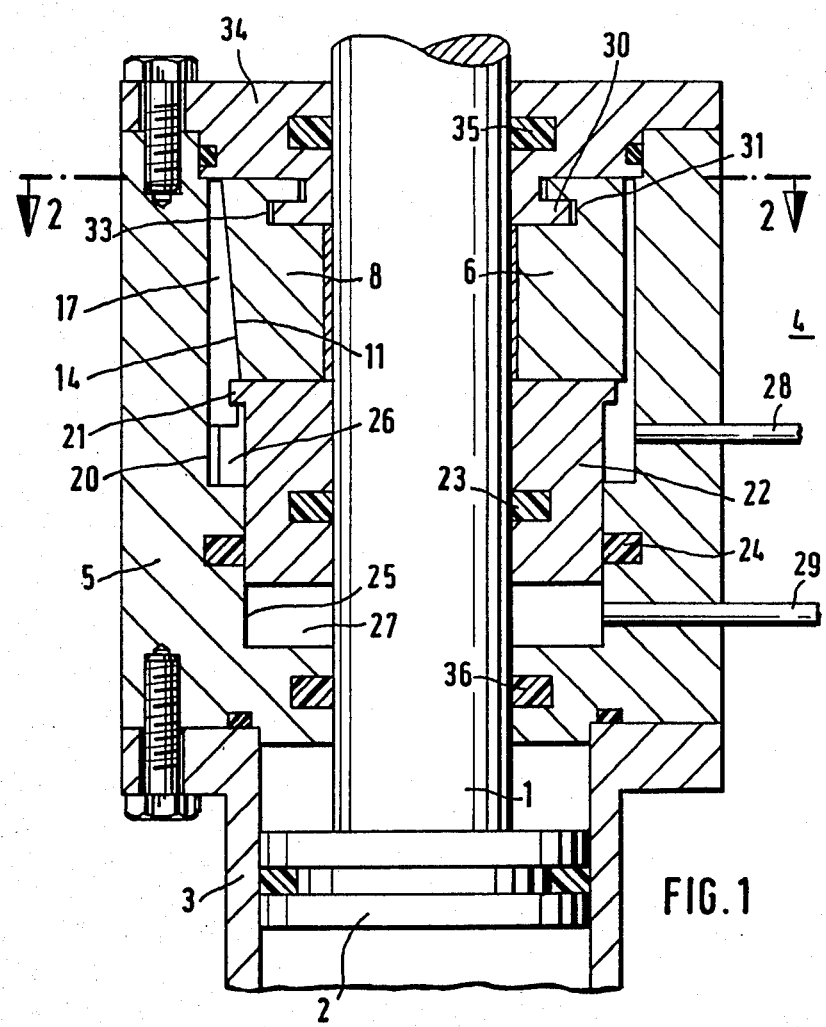
FIG. 1 is a longitudinal section through a clamping device in accordance with the invention, taken along line 1—1 of FIG. 2.
Figure 2:
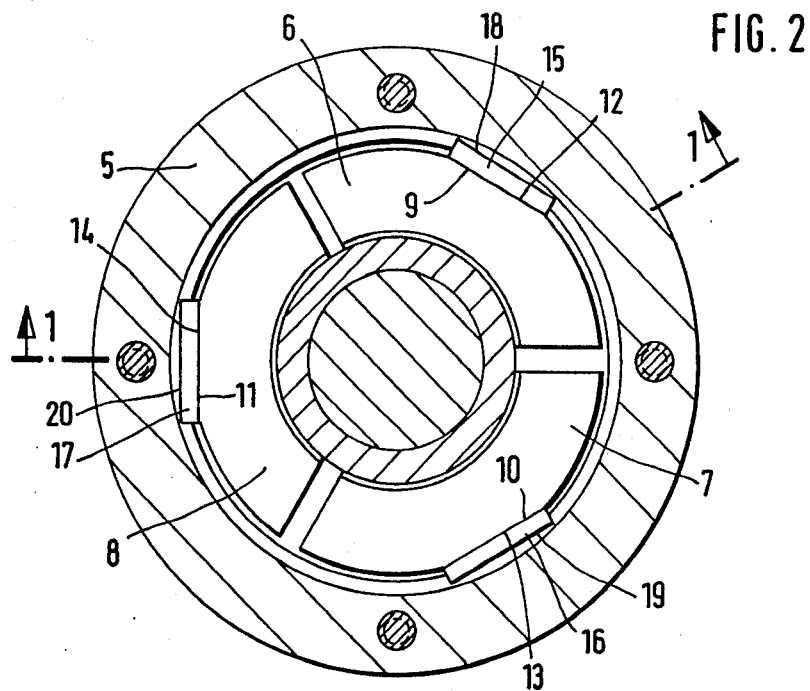
FIG. 2 is a cross-section along line 2—2 of FIG. 1.

FIGS. 1 and 2 show a piston bar 1 of circular cross-section which may take up an axial force and, in addition, torque. The piston bar 1 is connected to a drive piston 2, which is mounted in a hydraulic drive cylinder 3 and is displaceable therein in either direction when acted upon by a servo-medium. The housing 5 of a clamping head 4 is mounted on hydraulic drive cylinder 3.

Arranged in a radially displaceable manner in the housing 5 are three clamping jaws 6, 7, 8 having inclined guide faces 9, 10, 11 which form a small angle of between approximately 2° and 5° with the central axis of the piston bar 1. Complementary inclined guide faces 12, 13, 14 of axially slidable wedge elements 15, 16, 17 bear against these guide faces 9, 10, 11, and such wedge elements are guided in recesses 18, 19, 20 in the housing, and on the guide faces 9, 10, 11 of the clamping jaws 6, 7, 8.

For the purpose of achieving a displacement drive, the wedge elements 15, 16, 17 are each formed with a notch in which is engaged a flange 21 of an annular piston 22. By means of a resilient sealing ring 23, the annular piston 22 forms a seal with the piston bar 1 extending through it, and by means of a similar ring 24 forms a seal with a cylinder well 25 in the housing 5.

Pressure chambers 26, 27 are formed in the housing, at opposite sides of the annular piston 22, and to these pressure chambers a hydraulic pressure medium is fed through pipes 28, 29 in a direction corresponding to that in which it is required to move the annular piston 22.

The three clamping jaws 6, 7, 8 are radially displaceably mounted by engagement of segmental grooves 31, 32, 33 therein with an annular flange 30 of a cover portion 34. The cover portion 34 forms a seal with the piston bar 1 by means of an O-ring 35. A further O-ring 36 is provided in the housing 5 for effecting a seal with the piston bar.

Figure 3:
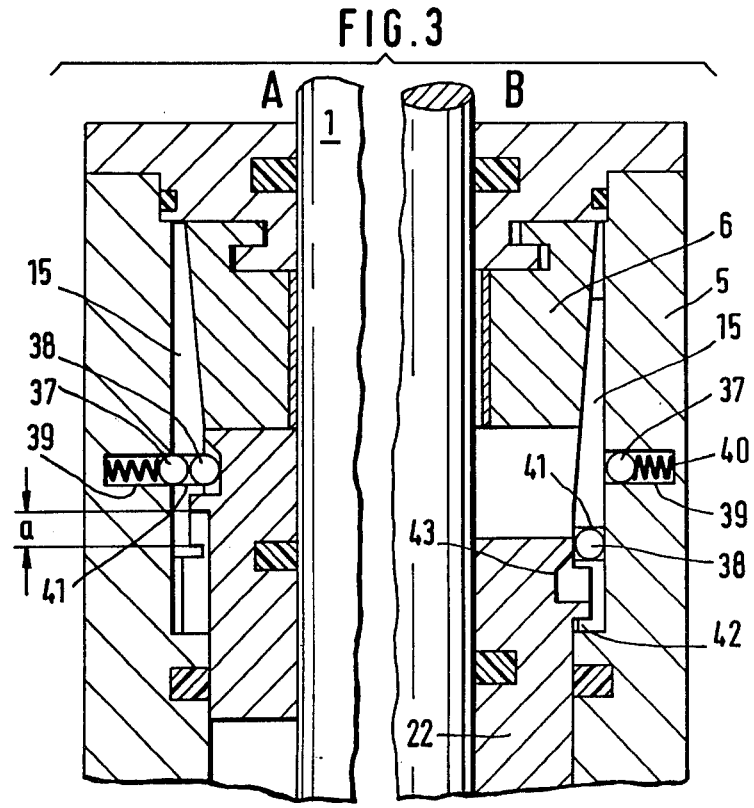
FIG. 3 is a longitudinal section showing a locking element, used in an arrangement shown in FIGS. 1 and 2, in the locking and release positions.

FIG. 3 illustrates the form of a locking means engaging the sliding jaws. The left-hand part of FIG. 3 shows the locking position (A), and the right-hand part of FIG. 3 serves to illustrate the release position (B). The locking means is provided in association with one or more of the jaws, and comprises for each such jaw balls 37, 38 which are located in blind-end bores 39 formed in the housing 5 and are urged radially inwardly by a helical compression spring 40. In the illustrated locking position (A) the two balls 37, 38 have entered an engagement throughbore or recess 41 formed in the wedge element 15. Because of the width of its channel-shaped engagement part 42 a lost motion is provided so that the wedge element is not entrained over the distance a when the annular piston 22 moves towards the release position. Formed in the piston 22 is an annular groove 43 which is bevelled at one side and in which the inner ball 38 partially engages.

In the case of the arrangement shown in FIGS. 1 and 2, when a pressure medium is supplied by way of the pipe 29, the pressure chamber 27 fills up, and the annular piston 22 pushes the wedge elements 15, 16, 17 upward with the aid of the flange 21, and this causes the clamping jaws 6, 7, 8 to apply radially inward gripping forces to the bar 1. With self-locking occurring, the clamping action is fully maintained even after the servo-pressure has ceased. In order to release the clamping action, pressure medium is introduced into the pressure chamber 26 through the pipe 28. The annular piston 22 moves downwards, disengaging the wedge elements 15, 16, 17 from the guide faces of the clamping jaws 6, 7, 8, and the bar 1 is released.

When use is also made of locking elements as in FIG. 3 (A), then after the locking position has been reached, the two balls 37, 38 move through the recess or through-bore 41 and thus block displacement of the wedge element 15 from the locking position.

When locking is to be released the servo-piston 22 first moves, without entraining the wedge element 15, over the distance a and pushes the inner ball 38 so far back into the recess 41 that the interface between the two balls 37, 38 is flush with the sliding face of the wedge element 15 remote from the wall of the housing as shown at B in FIG. 3. When this happens, the outer locking ball 37 moves completely into the blind bore 39, and the wedge element 15 can then follow the further movement of the servo-piston 22 into the release position, the inner ball 38 being held captive therein.

The servo-piston, shown as being a double-acting piston, may for certain purposes be replaced by a spring-returned single-acting servo-piston.

The illustrated clamping device enables the bar to be fixed in any given setting position in a substantially play-free manner and with great precision and, because of its robust and operationally reliable construction, is suitable for use in rough conditions. In addition, the device can be fixed and released in a yielding manner and with little noise. The required position of the rod can be set either by means of a simple translatory movement or by a combined rotary and translatory movement of the bar.

We claim:

1. A clamping device comprising:
   a housing;
   a bar mounted for guided movement in said housing;
   a plurality of jaws disposed about said bar and mounted in said housing so as to be capable only of radial movement inward into gripping engagement with said bar and outward out of said gripping engagement and to be prevented from axial movement relative to said housing and said bar;
   a cylinder formed in said housing and having an axis extending in a direction lengthwise of said bar;
   a piston slidably mounted in said cylinder;
   passage means for applying pressure fluid into said cylinder at at least one side of said piston; and
   wedge elements disposed radially between said jaws and said housing and connected to said piston for movement therewith in each direction of movement thereof, said wedge elements having planar guide faces with respect to said housing and said jaws.

2. A device as claimed in claim 1, further comprising means for locking the said jaws in gripping engagement with said bar.

3. A device as claimed in claim 2, wherein said locking means operates to lock said wedge elements and said piston with respect to said housing.

4. A device as claimed in claim 3, wherein movement of said piston to cause said jaws to release said bar releases said locking means.

5. A device as claimed in claim 4, wherein said locking means comprises a radially outwardly facing recess in said piston, a radially inwardly facing recess in said housing, a radially-extending through-passage in one of said wedge elements, a pair of locking members accommodatable in said radially-inwardly facing recess and in said through-passage, respectively, and spring means disposed in said radially-inwardly facing recess for urging the said locking member therein radially inward, said recesses and said through-passage coming into radial alignment when said piston is in its position corresponding to gripping engagement of said jaws on said bar and the connection between said one wedge member and said piston permitting a degree of lost motion, whereby initial movement of said piston away from said position moves said locking members radially outward into said through-passage and said radially inwardly facing recess, respectively, to release said one wedge element and said piston for axial movement together.

6. A device as claimed in claim 5, wherein said outwardly facing recess in said piston is a peripheral groove having a bevelled side wall for actuating outward movement of said locking members during said initial movement of said piston.

7. A device as claimed in claim 5, wherein said locking members are in the form of balls.

8. A device as claimed in claim 1, wherein said housing includes an end-cover encircling said bar, said end-cover having radial slideways for said jaws.

* * * * *